United States Patent Office 3,260,504
Patented July 12, 1966

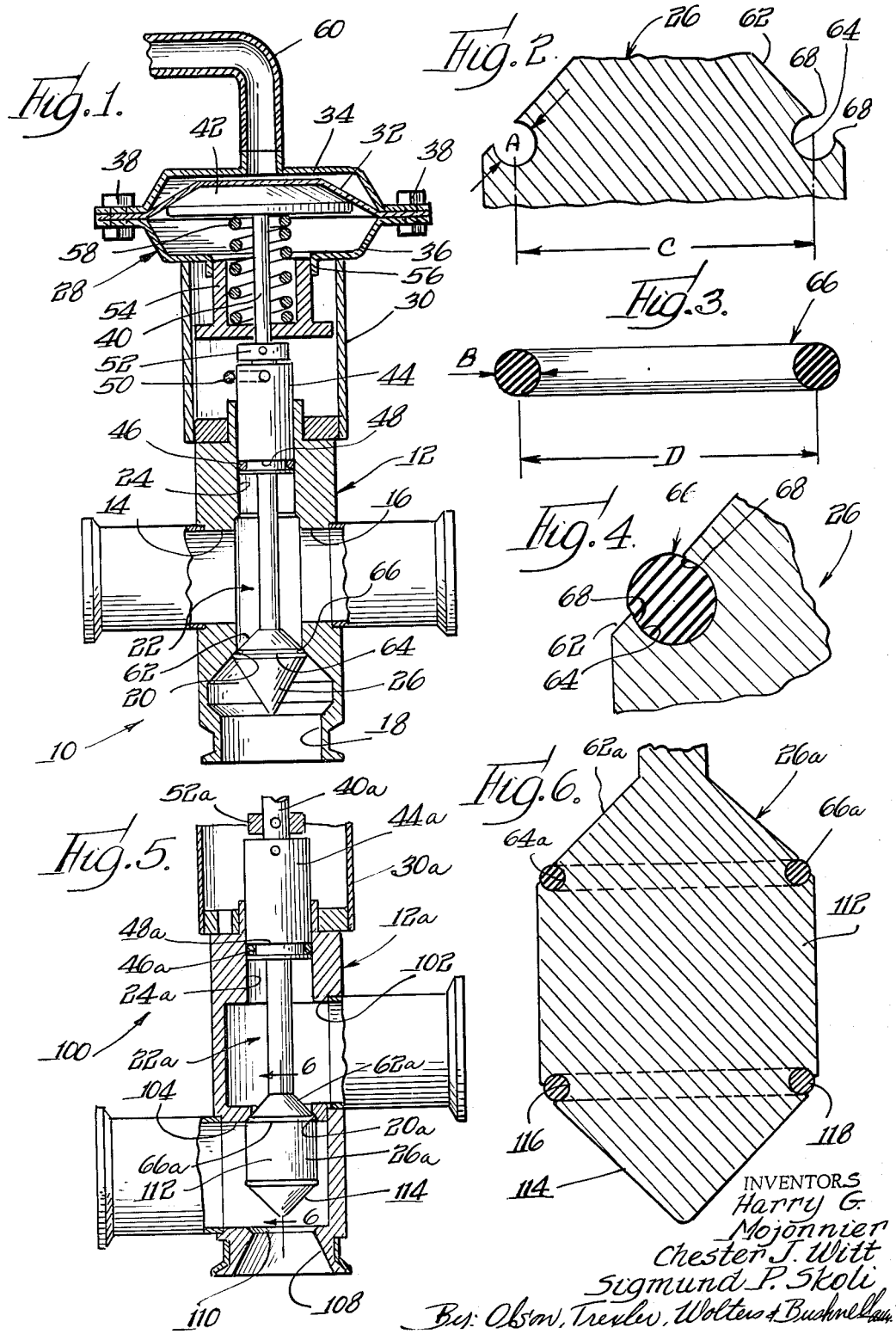

3,260,504
SEAT ARRANGEMENT FOR CONTROL
VALVES AND THE LIKE
Harry G. Mojonnier, River Forest, Chester J. Witt, Deerfield, and Sigmund P. Skoli, Elmwood Park, Ill., assignors to Mojonnier Bros. Co., Chicago, Ill., a corporation of Illinois
Filed Oct. 15, 1963, Ser. No. 316,354
3 Claims. (Cl. 251—357)

This invention relates generally to flow control devices and relates more particularly to valve seat arrangements.

In one specific aspect, the present invention relates to a valve of the type having complemental valve closing parts which are spaced apart for opening the valve.

Air-operated flow control valves ordinarily incorporate a valve stem which carries a valve member on its free end and which is connected to a flexible diaphragm for actuation. The diaphragm is exposed to the command air supply, and the valve member is provided with a valve seat. In the past, this valve seat has been fabricated from synthetic rubber and has been permanently installed on the valve member. Machined parts and welding of a tapered locking pin have been commonly employed in securing the valve seat in place. Because the valve seat has thus been made an integral part of the valve stem assembly, the entire valve stem assembly must be replaced when the seat is worn out. A substantial ineconomy in maintaining such a valve in operating condition has resulted.

Thereof, an important object of the present invention is to provide a control valve of the air-operated type which is economical to maintain.

Another object of the invention is to provide a replaceable valve seat arrangement for air-operated control valves.

A more general object of the invention is to provide a new and improved seat arrangement for control valves and the like.

A further object of the invention is to provide a valve seat arrangement that is characterized by a soft seating action.

A still further object of the invention is to provide a valve seat arrangement that is economical to produce.

These and other objects and features of the invention will become more apparent from a consideration of the following descriptions.

A valve arrangement in accord with the invention includes a valve body formed with fluid transfer passageways and having a valve closure surface encircling one of these passageways. A valve stem is arranged for reciprocal operation in the valve body for controlling flow through the pasageway that is associated with the valve closure surface; and the valve stem arrangement includes a valve member having a seat surface cooperatively confrontable with the valve closure surface. The valve member is fashioned with an endless groove which opens through the seat surface, the groove having converging edges which define a constricted throat for retaining a sealing member in the groove. An elastomeric sealing element is compressed in the groove in order to be retained therein, and a portion of the sealing element protrudes from the groove in order to contact the valve closure surface resiliently in terminating flow through the corresponding fluid transfer passageway.

The invention, both to its structure and mode of operation, will be better understood by reference to the following disclosure and drawing forming a part thereof, wherein:

FIG. 1 is a central sectional view of a throughflow valve arrangement constructed in compliance with the principles of the present invention;

FIG. 2 is a fragmentary, enlarged, central sectional view of the valve member of the arrangement of FIG. 1, FIG. 2 particularly illustrating the groove which is formed in the valve member for receipt of a sealing element;

FIG. 3 is an enlarged, central sectional view of a ring seal element for cooperative receipt in the groove of the valve member of FIG. 2;

FIG. 4 is a fragmentary, enlarged, central sectional view showing the cooperation between the ring seal of FIG. 3 and the groove of the valve member of FIG. 2;

FIG. 5 is a view similar to the showing of FIG. 1 but illustrating incorporation of the invention in a 3-way valve; and FIG. 6 is an enlarged, central sectional view taken along the line 6—6 of FIG. 5 and showing the valve member as incorporating dual seat surfaces, each of which is provided with a sealing element in accord with the invention.

Referring now in detail to the drawing, specifically to FIG. 1, a valve arrangement indicated generally by the numeral 10 will be seen to include a valve body 12 having aligned fluid transfer passageways 14 and 16 and having a lateral fluid transfer passageway 18. The valve body 12 is also fashioned with a conical valve closure surface 20 which encircles the lateral passageway 18; and a valve stem unit 22 is reciprocally mounted in an axial bore 24 of the valve body 12, the valve stem unit 22 including a diploconical valve body 26 which cooperates with the closure surface 20 in controlling flow through the lateral passageway 18. Thus, the valve arrangement 10 will be recognized as a through-flow valve with side outlet control.

The valve arrangement 10 is intended to be actuated by a control fluid such as air; and therefore, a diaphragm-type actuator unit 28 is mounted on the valve body 12 by a tubular housing or support assembly 30. The actuator unit 28 is aligned axially with the valve stem unit 22 and includes a flexible diaphragm 32 that is mounted between the peripheral flanges of a top cover 34 and a bottom cover 36, bolts 38 or other suitable fasteners being employed in this regard. An operating shaft 40 is affixed to the diaphragm 32 by means of a mounting plate 42; and the shaft 40 is connected, in turn, to the valve stem unit 22 by means of a cylindrical plunger 44, plunger 44 being slidably reciprocal in the upper portion of bore 24. A ring seal 46 is situated in an annular groove 48 fashioned in the plunger 44, and the ring seal 46 closes off the bore 24 whereby to prevent leakage in the direction of actuator unit 28. A retainer clip 50 and a tool retainer ring 52 are advantageously incorporated with the shaft 40 and the plunger 44. In addition, a cup-like spring retainer 54 is coupled to the bottom cover 36 at an annular flange 56, a compression spring 58 being situated between the spring retainer 54 and the plate 42 in order to bias the diaphragm 32 in a direction generally away from the valve body 12. In accordance with conventional practice, command air is introduced between the diaphragm 32 and the top cover 34 through a conduit 60.

In compliance with the features of the present invention, the valve member 26 is provided with a seat surface 62 that is situated so as to be cooperatively confrontable with the valve closure surface 20. In the embodiment of FIG. 1, the seat surface 62 takes a conical shape that is complemental with the conical shape of valve closure surface 20. Additionally, the valve member 26 is fashioned with an endless circular groove 64; and a sealing element or ring 66 is partially confined in the groove 64, sealing element 66 protruding partially from groove 64 in order resiliently to contact the valve closure surface 20 in terminating flow through the passageway 18. The groove 64 opens through the seat surface 62 and is specifically provided with inturned or converging edges 68 which define a constricted throat that serves to retain the sealing element 66 in the groove 64. More particularly, the groove 64 is fashioned with a circular cross-section and with an arcuate extent of more than 180° and preferably about 265°.

Cooperatively, the sealing element 66 is fashioned in toroidal shape and is fabricated from an elastomeric material in order to be resiliently compressible and stretchably elongatable. The sealing element 66 is also advantageously arranged to have a greater volume than the volume of groove 64 so that when the sealing element 66 is compressed into the groove, it will be grippingly retained therein and will partially protrude thereform as is well illustrated in FIG. 4. Further benefits with regard to the retention of sealing element 66 in the groove 64 are derived from making the sealing element with a smaller inside diameter than the corresponding dimension of the groove 64. So arranged, the sealing element 66 must be stretched in order to be fit into the groove 64. As a consequence of these arrangements, when the sealing element 66 is installed in the groove 64, it is in both axial tension and radial compression. A secure mounting of the sealing element in the groove results.

The dimensional relationships between the groove 64 and the sealing element 66 will become apparent from a more detailed consideration of FIGS. 2 and 3. In these figures, the reference character A represents the diameter of groove 64, B represents the cross-sectional diameter of the sealing element 66, C represents the mean overall diameter of the groove 64, and D represents the mean overall diameter of the sealing element 66. In order to achieve maximum security in the mounting of the sealing element 66 to the valve member 26, dimension B must exceed dimension A; and dimension C must exceed dimension D. Furthermore, the quantity $\pi D(B/2)^2$ must exceed the quantity $\pi C(A/2)^2$, preferably by approximately 6%.

Having thus described one construction of the invention, it is important now to state how the illustrated embodiment operates. Considering FIG. 1, it will be recognized that actuating signals in the form of air pressure are communicated to the flexible diaphragm 32 through the conduit 60, and the diaphragm 32 transduces these pressure signals to mechanical movement of the valve stem unit 22, converging or separating the valve member 26 with respect to the valve closure surface 20. Thus, the relative position of valve member 26 varies the annular orifice which connects the passageway 18 with the passageways 14 and 16. Because of the bias provided by compression spring 58, release of air pressure from the diaphragm 32 results in a complete closing of the connection between passageway 18 and passageways 14 and 16. This closure is effectuated by sealing element 66 resiliently contacting the valve closure surface 20.

As will be recognized, the valve member 26 is spaced apart from the closure surface 20 in those positions of use in which flow is permitted between passageway 18 and passageways 14 and 16. Therefore, the conventional means of retaining a sealing element in position have been found to be inappropriate, it being recalled that ring seals are commonly used between a sliding shaft and a shaft-receiving bore wherein no spacing apart of these components is necessary and wherein the position of the parts accordingly retains the ring seal in position. The instant valve arrangement retains the sealing element 66 in position on the valve member 26 regardless of the fact that the valve member is spaced apart from the closure surface 20 in many positions of use. The manner of achieving this positive positioning of the sealing element 66 has been described hereinabove in sufficient detail that it will be evident without further description.

However, so that the present invention may be thoroughly understood, it is advantageous to point out that the invention is not limited to the embodiment hereinabove described. The invention may also be embodied in a standard pin valve assembly or in a 3-way valve, for example; and a 3-way valve arrangement is illustrated in FIG. 5, being indicated generally by the numeral 100. Since the embodiment of FIG. 5 incorporates certain parts which are also found in the embodiment of FIGS. 1–4, like numerals have been used to designate like parts with the suffix letter "a" being employed to distinguish those elements associated with the embodiment of FIG. 5.

The valve arrangement 100 is characterized by the valve body 12a defining fluid transfer passageways 102 and 104 which are axially offset with respect to each other, the valve body 12a additionally defining a lateral fluid transfer passageway 108. The valve arrangement 100 is particularly distinguished by the arrangement of valve member 26a and its cooperating valve closure surfaces. Specifically, the conical valve closure surface 20a encircles the opening which interconnects passageways 102 and 104. Furthermore, a conical valve closure surface 110 is fashioned to encircle the opening between passageways 104 and 108. In order to accommodate and cooperate with the spaced closure surfaces 20a and 110, the diploconical valve member 26a incorporates a cylindrical mid-section 112.

The conical seat surface 62a of valve member 26a, groove 64a and sealing element 66a cooperate with the closure surface 20a in regulating and terminating flow between passageways 102 and 104; and in order to provide like functions between the passageways 104 and 108, the valve member 26a includes a second conical seat surface 114 as is well shown in FIG. 6. Correspondingly, the valve member 26a is fashioned with an endless circular groove 116 which opens through the seat surface 114 and which is fashioned like the groove 64a for purposes of receiving and retaining a sealing element 118 that is similar to the sealing element 66a. In other respects of construction and operation the valve arrangement 100 is similar to the valve arrangement 10.

The specific examples herein shown and described are to be considered as being primarily illustrative. Various changes beyond those described will, no doubt, occur to those skilled in the art; and such changes are to be understood as forming a part of this invention insofar as they fall within the spirit and scope of the appended claims.

We claim:

1. In a valve arrangement, the combination comprising: a valve body having fluid transfer passageways and a valve closure surface associated with one of said passageways; valve stem means operative in said valve body to control flow through said one passageway, including a one-piece valve member having a seat surface cooperatively confrontable with said valve closure surface and having an endless groove opening through said seat surface, said groove having a circular cross-section and an arcuate extent of more than 180° whereby to define a constricted throat for retaining a sealing element in said groove; and a resiliently compressible, solid, elastomeric, annular sealing element of greater volume than said groove, said sealing element being compressed in said groove in substantially completely filling relationship to be grippingly retained therein, said sealing element protruding partially from said groove for resiliently contacting said valve closure surface in terminating flow through said one passageway, said sealing element having a smaller inside dimension than the corresponding inside dimension of said groove whereby to be axially stretchably received therein.

2. In a valve arrangement, the combination according to claim 1 wherein the arcuate extent of said groove is about 265°.

3. In a valve arrangement, the combination according to claim 1 wherein the quantity $\pi D(B/2)^2$ exceeds the quantity $\pi C(A/2)^2$ by at least 6%, wherein D represents the mean overall diameter of said sealing element, B represents the cross-sectional diameter of said sealing element, C represents the mean overall diameter of said groove, and A represents the diameter of said groove.

References Cited by the Examiner

UNITED STATES PATENTS

| | | |
|---|---|---|
| 965,999 | 8/1910 | Faget. |
| 2,417,494 | 3/1947 | Hoof. |
| 2,616,512 | 11/1952 | Coon. |
| 2,704,650 | 3/1955 | Rand _____ 251—333 X |
| 2,870,987 | 1/1959 | Greenwood _____ 251—357 X |
| 3,043,335 | 7/1962 | Hunt _____ 137—625.5 X |
| 3,126,915 | 3/1964 | Hunt _____ 137—625.5 |

FOREIGN PATENTS

| | | |
|---|---|---|
| 875,431 | 8/1961 | Great Britain. |
| 927,973 | 6/1963 | Great Britain. |

MARTIN P. SCHWADRON, *Primary Examiner.*

ISADOR WEIL, *Examiner.*

A. COHAN, *Assistant Examiner.*